July 21, 1964 P. H. GENTZEL 3,141,474
SAFETY VALVE CONSTRUCTION
Filed Aug. 15, 1962 2 Sheets-Sheet 1

INVENTOR.
PERRY H. GENTZEL
BY
Caesar and Rivise
ATTORNEYS.

July 21, 1964  P. H. GENTZEL  3,141,474

SAFETY VALVE CONSTRUCTION

Filed Aug. 15, 1962  2 Sheets-Sheet 2

INVENTOR.
PERRY H. GENTZEL
BY
Caesar and Rivise
ATTORNEYS.

United States Patent Office 3,141,474
Patented July 21, 1964

3,141,474
SAFETY VALVE CONSTRUCTION
Perry H. Gentzel, 607 W. College Ave., State College, Pa.
Filed Aug. 15, 1962, Ser. No. 217,051
1 Claim. (Cl. 137—469)

This invention relates to an improved safety valve construction, and it particularly relates to an improved safety valve of the so-called "pop" type which are generally utilized in conjunction with steam boilers, oil stills, compressed air tanks, superheaters or the like. Specifically, this constitutes an improvement over the invention embodied in applicant's prior Patent No. 2,278,437 dated April 7, 1942.

This application is a continuation-in-part of my co-pending application Serial No. 72,974, filed December 1, 1960, now abandoned.

The device embodied in the aforesaid Patent No. 2,278,437 was, in general, effective for many purposes. However, at very high temperatures, such as are developed in steam boilers or the like, it did not properly close and open because the metal, usually steel, or which the valve head and stem were constructed, has a tendency to expand and contract under large changes of temperature. For example, it has been found that for a temperature difference of 500° F. a steel valve stem will change in length as much as 0.003 inch per inch of stem length. This means that for a stem of 10 inches, there would be a change of about $\frac{1}{32}$ inch in length.

A change in valve stem length, as indicated above, is sufficient to prevent adequate seating of the valve and also affects the amount of pressure that is actually required to move the valve to and from its open or closed position. At the same time, it is quite difficult if not impossible to obtain a valve spring which will adequately compensate for such variations in length and yet permit immediate operation of the valve when the predetermined pressures are reached.

It is also important, in order to obtain immediate and uniform response to pressure changes, to have a valve spring construction whereby the spring is never subject to eccentric loading.

In addition to the aforementioned considerations, it is desirable to have a piston ring construction which will completely prevent leakage of pressure fluid past the piston valve but which will not have any tendency to be locked by the pressure and thereby prevent effective operation of the valve. The use of the usual type of $\frac{3}{16}$ inch piston rings would not be feasible for the purposes of the present invention because such rings would tend to be pressure-locked by the high pressures exerted.

It is, therefore, one object of the present invention to provide an improved safety valve construction which is immediately responsive at all variations of temperature but which is yet held firmly in its predetermined open or closed positions.

Another object of the present invention is to provide an improved safety valve construction of the aforesaid type where the valve spring is not subject to eccentric loading.

Another object of the present invention is to provide an improved safety valve construction of the aforesaid type having a piston ring assembly adapted to effectively prevent seepage of fluids past the valve head regardless of the pressures involved while, at the same time, being free of any tendency to be locked in place by such pressure.

The foregoing and other objects of this invention as well as the novel features thereof may be more fully appreciated from the following description when read together with the accompanying drawings, in which.

Figure 1:
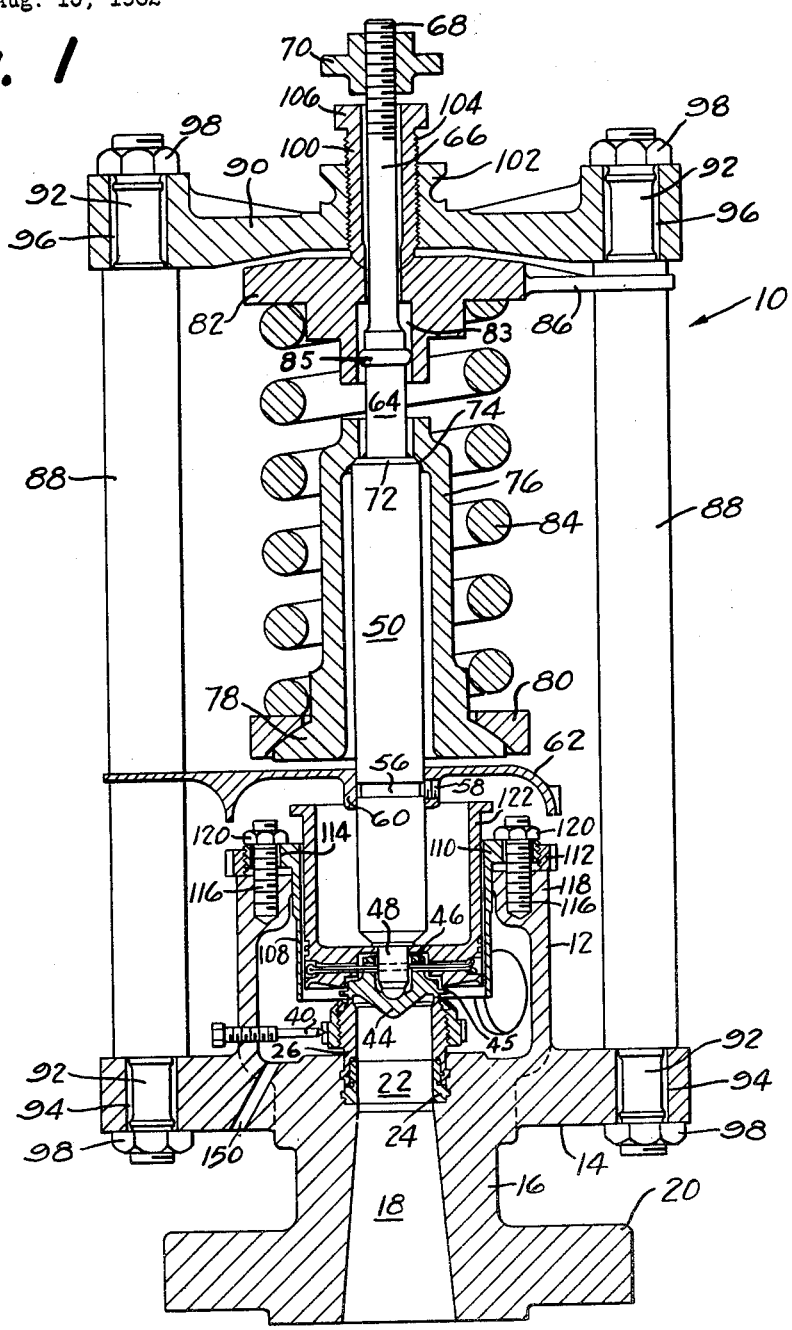
FIG. 1 is a vertical sectional view, with parts shown in elevation, of a valve assembly embodying the present invention.
Figure 2:
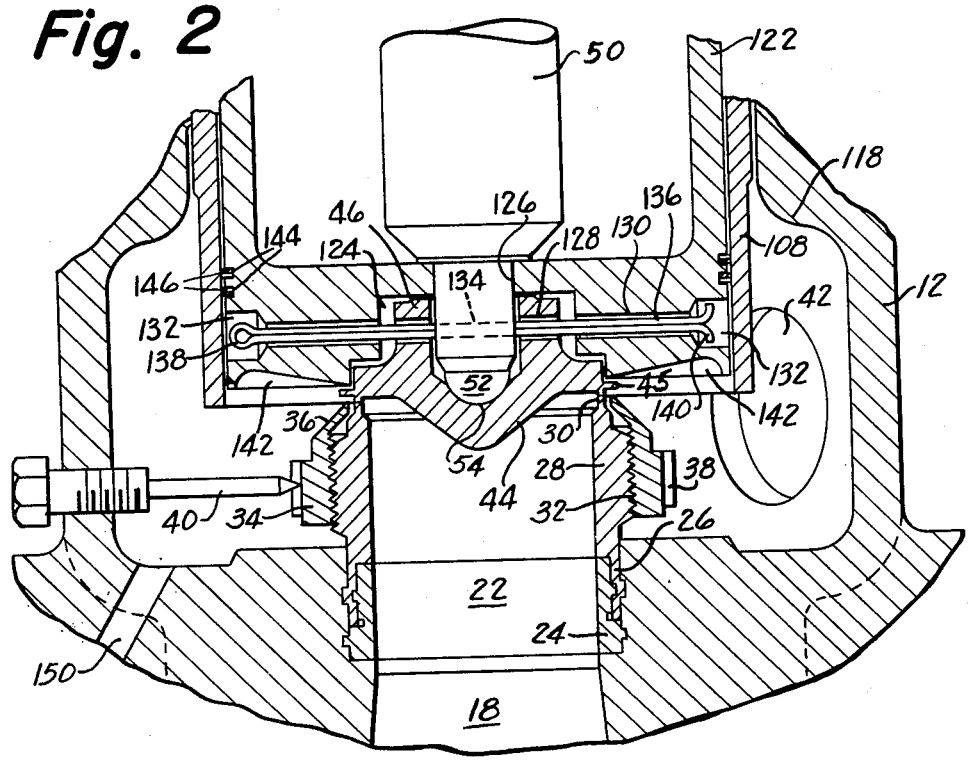
FIG. 2 is an enlarged, detailed sectional view of the valve head and valve seat and the surrounding areas of the valve assembly of FIG. 1.
Figures 3, 4:
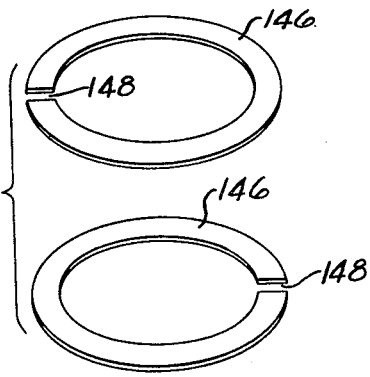
FIG. 3 is a sectional view of the packing ring assembly shown in FIGS. 1 and 2 but greatly enlarged relative thereto.
FIG. 4 is an exploded view of the packing ring assembly.

Referring now in greater detail to the various figures of the drawings wherein similar reference characters refer to similar parts, there is shown a valve assembly, generally designated 10, comprising a housing 12 extending up from arms 14 integral with a casting 16 having an upwardly and inwardly tapering passage 18 therein. A bottom flange 20 is also provided on the casting 16.

The upper end of the passage 18 leads into a cylindrical passage 22 defined by a sleeve 24 positioned in a corresponding counterbore in the casting 16. In this counterbore is also provided a downwardly-extending cylindrical flange 26 which telescopically embraces the upper portion of sleeve 24. The flange 26 is integral with an upwardly extending, hollow tube 28 having an annular valve seat 30 at its upper edge.

The tube 28 is provided with threads 32 on its outer periphery and adjustably engaged with these threads is an internally threaded nozzle ring 34 having an upwardly and inwardly extending annular flange 36. The ring 34, which is used to obtain a minimum "blowdown," is also provided with a series of teeth 38 on its outer periphery. These teeth are spaced from each other to provide grooves for selectively receiving a locking screw 40. The locking screw 40 is used to maintain the ring 34 in the threadedly adjusted position.

The passage 18 is adapted to be connected with the relief opening of a steam boiler or tank containing fluid under pressure while an opening 42 is used to provide a passage to atmosphere. As is standard practice in the safety valve art, it is to be understood that the steam exiting through opening 42 passes through a conduit on the way to the atmosphere. Thus, none of the steam will rise directly and contact the valve stem or frame rods.

Coacting with the seat 30 is a valve disc 44 having a conical central portion adapted to enter into the valve seat opening when the annular peripheral portion mates with the valve seat itself. It is also provided with a radially extending peripheral flange 45. Extending up from the disc 44 is a hollow cylindrical head 46 into which extends the lower reduced end portion 48 of a spindle 50. The lower end 52 of the portion 48 is hemispherical and fits into a complementary hemispherical socket 54 in the interior of disc 44 whereby a ball and socket arrangement is provided.

The spindle 50 is provided intermediate its ends with a peripheral groove 56 which receives a locking screw 58 connected to a depending ring 60 of a deflector plate 62. Deflector plate 62 serves to deflect any steam or vapor that might otherwise reach the frame rods and the spring, thereby protecting said elements from great and sudden atmosphere changes. Thus, heat cannot reach the frame rods and spring directly. The upper portion of spindle 50 is reduced at 64 and is further reduced at 66. The portion 66 is screw-threaded at 68 to engage with a threaded lock nut 70.

Between the main portion of spindle 50 and the reduced portion 64 is a shoulder 72 which supports an interior shoulder 74 of a sleeve 76. The sleeve 76 is provided with a flange 78 at its lower end. The flange 78 has a convexly curved or arcuate top surface which receives a complementary concavely curved undersurface of a spring follower 80. Between this spring follower 80 and a spring retainer ring 82 is positioned a coil spring 84 surrounding the spindle 50 and sleeve 76. The retainer ring 82 is provided with a guide rod 86 which serves to prevent rotation of the retainer ring 82 and the spindle 50 with rotation of the pressure screw (to be hereinafter described). Retainer ring 82 is provided with a cylindrical central opening 83 through which spindle 50 passes. A collar 85, having a rounded outer edge, extends outwardly from and is integral with reduced portion 64 of spindle 50.

If desired, the retainer ring 82 may also be made in two parts with complementary curved surfaces such as at 78 and 80.

The rods 88 extend between the arms 14 at the lower end and a yoke or cross-bar 90 at the upper end. The rods 88 each have a reduced portion 92 at each end and these reduced portions extend through corresponding openings 94 in the arms 14 and 96 in the yoke 90. Each reduced portion 92 is threaded to receive a lock nut 98 to hold the rods 88 firmly in position whereby they serve as a spacing means between the arms 14 and yoke 90.

Seated in a central recess of the retainer ring 82 is one end of a hollow pressure or adjusting screw 100 which extends up from the central aperture of the ring 82 and is used to set the valve to the required popping pressure by adjusting the pressure on the spring 84. It also serves as a bushing or guide for the upper portion 66 of spindle 50. This screw 100 itself extends through a central, hollow, internally threaded boss 102 integral with the yoke 90 and is externally threaded at 104 to engage with the internal threads of the boss. The screw 100 is additionally provided with a top lip or flange 106 which acts as a stop to limit downward movement of the nut 70 and thereby limit downward movement of the spindle 50.

Within the housing 12 is provided a guide sleeve 108 which has a top flange 110. The flange 110 is externally threaded to receive an internally threaded guard ring 112 and is also provided with a plurality of holes 114 to accommodate bolts 116 which extend into threaded openings in an internal peripheral boss 118 of the housing 12. These bolts 116 are held in place by lock nuts 120.

Slidable within the guide sleeve 108 is a hollow piston 122 having an open top and a closed bottom with the bottom wall having a central undercut recess 124 to receive the hollow head 46 and a central bore 126 intersecting the recess 124 and accommodating the reduced spindle portion 48.

The head 46 is transversely apertured at 128, this aperture 128 mating with a transverse aperture 130 in the piston 122. At either end, the aperture 130 is provided with an enlarged recess or counterbore 132. The reduced spindle portion 48 is also provided with a transverse aperture at 134 mating with the apertures 128 and 130 and through all these mating apertures extends a cotter pin 136 having its head 138 in the recess 132 and its bent ends 140 in the recess 132. By means of this cotter pin, the disc 44 is swivelled to the piston 122 to provide play for automatic adjustment of the disc on the seat 30.

The bottom wall of the piston 122 is provided, around the recess 124, with an undercut annular groove 142. This groove 142 is radially outwardly and upwardly inclined from the center, with a long gradual slope, and terminates in a downwardly curved radial outer end wall.

The side wall of the piston 122 is provided with a pair of annular grooves 144 vertically spaced from each other. In each of these grooves 144 are two piston rings 146 of very small thickness. The piston rings 146 illustrated are of about 0.024 to 0.030 inch thickness. These piston rings are each split, as at 148, but are reversed relative to each other so that the splits are about 180 degrees offset from each other. This provides a labyrinth type packing which would not be possible if only a single double-thickness piston ring was used. Furthermore, the thin construction of the rings prevents pressure lock of the rings under high steam pressure which often results when using the ordinary 3/16 inch rings since the rings 146, because of their thin construction, provide a minimum of lateral pressure against the guide sleeve 108.

The use of rings approximating 0.024 to 0.030 inch in thickness is critical to this invention. At pressures approximating 3,000 p.s.i.g., at which the valve of this invention is used, the standard piston rings which are currently available, and range in thickness from 1/8 inch to 1/4 inch would be totally unacceptable. These standard rings would be forced outwardly at these pressures against the side of the guide, thereby locking the valve in its open position after it is blown. Using the thin rings which were specially designed for this invention, there is a vapor-tight seal formed between the piston and its guide. However, there is substantially no wall friction between the rings and the guide. This is because the rings are locked against the top of grooves 144 rather than against the wall of the guide when the valve is blown. Although the standard thick piston rings are suitable for use at 1000 to 1200 p.s.i.g. in an internal combustion engine which is lubricated, they are totally unacceptable for use at 3000 p.s.i.g. in an unlubricated safety valve.

The housing 12 is provided with a drain opening 150 about 3/64 inch in diameter. This opening permits drainage of any water of condensation accumulating in the housing.

In operation, as the safety valve permits steam to exhaust and expand to atmospheric pressure, the steam flows through the passage 18 and first strikes the disc 44, lifting it from the seat 30. As soon as the disc 44 is lifted from its seat, the full piston annulus is subjected to the force of the flowing steam. This force is applied against undercut groove 142. The resulting action, because of the shape of the groove 142, is similar to a nozzle of a given diameter exerting the energy of mass flow of fluid against turbine buckets wherein the direction of flow is changed by 180 degrees thereby inducing a force twice that exerted on a flat area. This reversal of flow also aids in preventing leakage past the piston rings 146 with the resulting dissipation of energy.

An additional force that is used to keep the valve open is that of the back pressure which develops when the reversed steam impinges off the inner bottom surface of housing 12. One reason that full use of the back pressure can be obtained is the fact that groove 142 is entirely within guide 108. Thus, guide 108 insures that the steam will be directed vertically downward, instead of dissipated to the atmosphere, after its direction is reversed by groove 142.

In my prior Patent No. 2,278,437, all of the steam was immediately dissipated to the atmosphere through exhaust ports 22, 23, 24, and 25, with no attempt being made to take advantage of any back pressure. Thus, all the huddling chambers and exhaust belts, including their metering valves shown in my Patent No. 2,278,437, have been eliminated by this invention, thus simplifying the design by decreasing the number of parts. Furthermore, this change in design allows the use of a spring which is twice as heavy as that which was useable with my prior valve.

It should also be noted that the ball and socket arrangement provided by flange 78 and spring follower 80 obviates any instability due to elongation of spindle 50. Furthermore, collar 85 also aids in overcoming any dimensional instability. Since cylinder 83 is contacted solely by the rounded ends of collar 85, there is only a small amount of friction within the cylinder. If spindle 50 should become elongated, the spindle is pivotal about collar 85, thereby aiding in the correct seating of the valve.

The above operation is based on the "equation for the continuity of energy" whereby the velocity of the steam resulting from a decrease in enthalpy of the steam is found from $V = 223.8 \sqrt{h_1 - h_2}$.

Assuming that the pressure of the steam is 2900 p.s.i.a. and that the steam is saturated, the enthalpy is 1039.0 B.t.u./lb. Supposing that adiabatic expansion takes place to a back-pressure of about 200 p.s.i.a., then the enthalpy would be about 900 B.t.u./lb. from the Mollier chart.

This gives $$V = 223.8 \sqrt{1093 - 900}$$
$$= 2640 \text{ ft./sec.}$$

If the steam is superheated 1000 degrees, then the initial enthalpy would be 1820 B.t.u./lb. Again supposing adiabatic expansion takes place to a back-pressure of about 200 p.s.i.a., the enthalpy may be assumed to be about 1400 since the Mollier chart cannot be used.

The velocity in this case is found to be $$V = 223.8 \sqrt{1820 - 1400}$$
$$= 4700 \text{ ft./sec.}$$

For saturated steam, on the basis of a velocity of 2640 ft./sec., the weight of steam flowing through the nozzle is approximately $$W = \frac{AV}{v}$$

where $A$ = area of nozzle in square feet
$V$ = velocity in ft./sec.
$v$ = specific volume in cu. ft./lb.

Using figures based on actual valve construction, $$W = \frac{2.264 \times 2640}{144 \times 0.1035}$$
$$= 400 \text{ lb./sec.}$$

Assuming complete reversal of direction of flow, a coefficient for the outlet orifice of 0.60 and a restriction coefficient for losses due to friction of 0.75, the approximate force exerted in keeping the valve open is $$F = \frac{W}{g}(2V) \times 0.60 \times 0.75$$
$$= \frac{400}{32.2}(2 \times 2640) \times 0.60 \times 0.75$$
$$= 29,500 \text{ lbs.}$$

For superheated steam, where $v$ for 1600° F. is used, $$W = \frac{2.264 \times 4700}{144 \times 0.4258}$$
$$= 174 \text{ lb/sec.}$$

With the same coefficients as for saturated steam, $$F = \frac{174}{32.2}(2 \times 4700) \times 0.60 \times 0.75$$
$$= 22,900 \text{ lbs.}$$

In this case, the coefficient of 0.75 is probably too conservative because the steam is still in a superheated condition at 200 p.s.i.a. and the frictional resistance is not as great as with wet steam.

The above figures clearly illustrate that a much heavier (stiffer) spring 84 can be used than was previously possible because a greater force is generated to maintain the valve open. This heavier spring construction permits better adjustment for slight differential changes in elongation of the frame rods and valve stem and body. In addition, the curved mating surfaces of the flange 78 and spring follower 80 provide what is, in effect, a ball and socket arrangement which forms a sort of universal joint to prevent eccentric loading.

In addition to overcoming any slight differential changes in the elongation of the frame rods and valve stem, the heavier spring construction also overcomes any dimensional instability of the seating faces of the valve. In the past, the instability of steel valve trim at the seating faces has always caused trouble at high pressures. This is due to the pinpointing or small points of steel rising from each seat, thereby causing leakage at high pressures. This pinpointing or slight unevenness of the seating faces is entirely overcome by the use of the heavier springs in the valve of this invention. Thus, the valve of this invention remains tight and will not leak at pressures approximately 3000 p.s.i.g., as do the valves of the prior art designs.

Obviously many modifications and variations of the present invention are possible in the light of the above teachings. It is, therefore, to be understood that within the scope of the appended claim, the invention may be practiced otherwise than as specifically described.

What is claimed as the invention is:

In a safety valve comprising a valve housing, an inlet and an outlet in said housing, said inlet being in fluid connection with a passage adapted to be connected to a source of fluid under pressure and said outlet providing an exhaust to the atmosphere, a valve seat in said inlet within said housing, a guide sleeve in said housing spaced above said valve seat and coaxial therewith, a piston slidable within said guide sleeve, and a valve disc connected to said piston in a position to seat against said valve seat, the improvement comprising a spring assembly operatively connected to said piston for resiliently urging said piston and said valve disc toward said valve seat, said spring assembly comprising a sleeve encompassed by a coil spring and having a flange at one end, said flange having a curved surface, a spring follower, said spring follower having a complementary curved surface mating with the curved surface of said flange to provide a universal joint, a spindle passing through said sleeve, said sleeve resiliently urging the spindle downwardly by the force of said spring, said spindle having a collar thereon which is slidably and universally pivotally received in the bore of a retainer ring against which said spring bears, an annular undercut groove in said piston and concentric with said valve disc, said groove being radially and axially inwardly inclined relative to the body of said piston with a long gradual slope and having an axially outwardly curved radial outer surface, said groove being positioned radially outward of said valve seat and said piston being provided with at least one peripheral recess on its outer peripheral wall, a pair of thin piston rings in said recess, said piston rings ranging in thickness from about 0.024 to 0.030 inch, said piston rings being positioned relative to one another in such a manner that their splits are about 180 degrees apart to form a labyrinth seal with said guide sleeve, whereby said piston rings will be forced against the top of the groove upon the opening of the valve seat and remain slidable relative to said guide sleeve.

References Cited in the file of this patent

UNITED STATES PATENTS

| | | |
|---|---|---|
| 306,208 | Ashton et al. | Oct. 7, 1884 |
| 1,807,594 | Hopkins | June 2, 1931 |
| 1,881,849 | Morton | Oct. 11, 1932 |
| 2,622,613 | McNeal | Dec. 23, 1952 |
| 2,752,940 | Gentzel | July 3, 1956 |
| 2,840,338 | Shaw | June 24, 1958 |

FOREIGN PATENTS

| | | |
|---|---|---|
| 176,037 | Great Britain | Feb. 9, 1922 |